US008755331B2

(12) United States Patent
Boland et al.

(10) Patent No.: US 8,755,331 B2
(45) Date of Patent: Jun. 17, 2014

(54) DETERMINING A PHYSICAL LOCATION OF A WIRELESS MOBILE DEVICE

(75) Inventors: Kieran G. A. Boland, Newry (IE);
Telemaque Ndizihiwe, Tallaght (IE);
Stephen Renwick, Harolds Cross (IE);
Mark E. Wallace, Blackrock (IE)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 13/323,877

(22) Filed: Dec. 13, 2011

(65) Prior Publication Data
US 2013/0148573 A1 Jun. 13, 2013

(51) Int. Cl.
*H04W 84/02* (2009.01)
(52) U.S. Cl.
USPC .......................................... 370/328
(58) Field of Classification Search
None
See application file for complete search history.

(56) References Cited

U.S. PATENT DOCUMENTS

| 4,920,556 | A | 4/1990 | Wong | |
|---|---|---|---|---|
| 6,788,702 | B1 * | 9/2004 | Garcia-Luna-Aceves et al. | 370/458 |
| 7,103,151 | B2 | 9/2006 | Lass et al. | |
| 7,280,580 | B1 * | 10/2007 | Haartsen | 375/138 |
| 7,389,352 | B2 | 6/2008 | Cromer et al. | |
| 7,474,646 | B2 | 1/2009 | Tamaki | |
| 7,576,694 | B2 * | 8/2009 | Anjum et al. | 342/464 |
| 7,590,097 | B2 * | 9/2009 | Ekberg et al. | 370/338 |
| 7,912,446 | B2 | 3/2011 | Zhu et al. | |
| 7,941,177 | B2 * | 5/2011 | Kim | 455/552.1 |
| 7,944,909 | B2 | 5/2011 | James | |
| 8,364,172 | B2 * | 1/2013 | Guanfeng et al. | 455/456.2 |
| 2003/0227914 | A1 * | 12/2003 | Nguyen | 370/386 |
| 2004/0121792 | A1 * | 6/2004 | Allen et al. | 455/519 |
| 2004/0233855 | A1 * | 11/2004 | Gutierrez et al. | 370/252 |
| 2005/0030921 | A1 * | 2/2005 | Yau | 370/329 |
| 2005/0135292 | A1 * | 6/2005 | Graumann | 370/328 |
| 2005/0157661 | A1 * | 7/2005 | Cho | 370/254 |
| 2007/0274232 | A1 * | 11/2007 | Axelsson et al. | 370/254 |
| 2008/0014901 | A1 | 1/2008 | Motley et al. | |
| 2008/0160952 | A1 * | 7/2008 | Bull et al. | 455/404.2 |
| 2009/0003312 | A1 | 1/2009 | Velazquez et al. | |
| 2010/0020776 | A1 | 1/2010 | Youssef et al. | |
| 2010/0232317 | A1 * | 9/2010 | Jing et al. | 370/254 |
| 2011/0064046 | A1 | 3/2011 | Zhu | |

(Continued)

OTHER PUBLICATIONS

PCT/US2012/066692 International Search Report, filed Nov. 28, 2012.

(Continued)

*Primary Examiner* — Chirag Shah
*Assistant Examiner* — Jael Ulysse
(74) *Attorney, Agent, or Firm* — David J. Zwick; John Pivnichny

(57) ABSTRACT

Determining the physical location of a mobile wireless device. A computer receives 1-hop and 2-hop neighbor information from a mobile wireless device for neighbor devices of the mobile wireless device responding to a discovery request transmitted by the mobile wireless device in an ad hoc wireless communications protocol. The computer determines a physical location of the mobile wireless device based in part on stored fixed physical locations of responding devices; an area in which the mobile wireless device is in range of responding 1-hop neighbors associated with a fixed physical location; and an area in which the mobile wireless device is in range of responding 1-hop neighbors not associated with a fixed physical location, which are in the range of 2-hop neighbors associated with fixed physical locations.

6 Claims, 8 Drawing Sheets

(56) References Cited

U.S. PATENT DOCUMENTS

2011/0273991 A1* 11/2011 Dahl et al. .................... 370/241
2011/0280156 A1* 11/2011 Jing et al. ..................... 370/254
2013/0107748 A1* 5/2013 Dravida et al. ............... 370/252

OTHER PUBLICATIONS

Audiocodes Ltd., "Geographical Location Information for Emergency Calls over VoIP Networks," Version 1, published on: Oct. 2009, Copyright 2009.
Canadian Radio-Television and Teleocmmunications Commission, "Wireless Enhanced 911 (E911) Services," date modified: Feb. 1, 2010, <http://www.crtc.gc.ca/eng/info_sht/t1035.htm>.
Clausen et al., "Generalized Mobile Ad Hoc Network (MANET) Packet/Message Format", Internet Engineering Task Force (IETF) Network Working Group RFC 5444, Feb. 2009.
Cybertelecom, "VoIP 911 Regulation," accessed on: Dec. 23, 2010, <http://www.cybertelecom.org/voip/911reg.htm>.
Database Systems Corp., Emergency Broadcast Dialer, Analog Voice Broadcasting System, "Emergency Auto Dialer Systems," accessed on: Dec. 23, 2010, <http://www.databasesystemscorp.com/psemergencyanalog.htm>.
"IEEE 802.3™-2008 IEEE Standard for Information technology, Specific requirements Part 3: Carrier sense multiple access with Collision Detection (CSMA/CD) Access Method and Physical Layer Specifications", Dec. 26, 2008, Section One, Institute of Electrical and Electronics Engineers, Inc.
"IEEE 802.3™-2008 IEEE Standard for Information technology, Specific requirements Part 3: Carrier Sense Multiple Access with Collision Detection (CSMA/CD) access method and Physical Layer specifications", Dec. 26, 2008, Section Two, Institute of Electrical and Electronics Engineers, Inc.
"IEEE 802.3™-2008 IEEE Standard for Information technology, Specific requirements Part 3: Carrier Sense Multiple Access with Collision Detection (CSMA/CD) access method and Physical Layer specifications", Dec. 26, 2008, Section Three, Institute of Electrical and Electronics Engineers, Inc.
"IEEE 802.3™-2008 IEEE Standard for Information technology, Specific requirements Part 3: Carrier Sense Multiple Access with Collision Detection (CSMA/CD) access method and Physical Layer specifications", Dec. 26, 2008, Section Four, Institute of Electrical and Electronics Engineers, Inc.
"IEEE 802.3™-2008 IEEE Standard for Information technology, Specific requirements Part 3: Carrier Sense Multiple Access with Collision Detection (CSMA/CD) access method and Physical Layer specifications", Dec. 26, 2008, Section Five, Institute of Electrical and Electronics Engineers, Inc.
"IEEE 802.11n™-2009 IEEE Standard for Information technology, Specific requirements Part 11: Wireless LAN Medium Access Medium (MAC) and Physical Layer (PHY) Specifications Amendment 5: Enhancements for Higher Throughput", Oct. 29, 2009, Institute of Electrical and Electronics Engineers, Inc.
"IEEE 802.15.4a™-2007 IEEE Standard for Information technology, Specific requirements Part 15.4: Wireless Medium Access Control (MAC) and Physical Layer (PHY) Specifications for Low-Rate Wireless Personal Area Networks (WPANs) Amendment 1: Add Alternate PHYs", Aug. 31, 2007, Institute of Electrical and Electronics Engineers, Inc.
Liang et al., "PEC: A Privacy-Preserving Emergency Call Scheme for Mobile Healthcare Social Networks," Journal of Communications and Networks, vol. 13, No. 2, Apr. 2011. Copyright 2011 KICS.
Postel, "User Datagram Protocol", Internet Engineering Task Force (IETF) Standard Request for Comment 768, Aug. 28, 1980.
Voicent Communications, Inc., "Autodialer for Emergency Notifications," accessed on: Dec. 23, 2010, <http://www.voicent.com/telephone-emergency-notification.php>.
Wikipedia, "Enhanced 9-1-1 -Wikipedia, the free encyclopedia," published on: Aug. 17, 2011, <http://en.wikipedia.org/wiki/Enhanced_911>.
Wikipedia, "Enhanced 9-1-1-Wikipedia, the free encyclopedia," published on: Dec. 16, 2010, <http://en.wikipedia.org/w/index.php?title=Enhanced_9-1-1&oldid=402724235>.

* cited by examiner

DETERMINING A PHYSICAL LOCATION OF A WIRELESS MOBILE DEVICE

FIELD OF THE INVENTION

The present invention relates generally to topology discovery in wireless networks, and more particularly to physical mapping of wireless networks.

BACKGROUND

Network topology discovery is the process by which all the nodes that are available in a network are identified. Typically, the output of a topology discovery process is represented by a list of available hosts, routers, and subnets. Topology discovery methods can also identify other network resources such as printers or gateways within the specified scope of the network. Various techniques can be used for topology discovery. For example, some techniques query routers and Dynamic Host Configuration Protocol (DHCP) servers in the network and collect Internet Protocol (IP) addresses from the routing tables, active leases, and defined subnet lists from the DHCP servers. Other techniques direct queries to individual network devices using mechanisms such as Simple Network Management Protocol (SNMP), ping, traceroute, etc. Topology discovery methods can typically be used to produce, for example, a "linked-list" report listing devices in the network indicating how they are connected, or a graphical representation showing network devices and nodes, with connections indicated as connecting lines between entities.

SUMMARY

Embodiments of the present invention provide a system, method, and program product for a computer to identify wireless enabled neighbors, the computer connected to a network via an Ethernet or wireless infrastructure mode communications protocol. The computer switches to a first ad hoc wireless communications protocol, transmits a wireless discovery message via the first ad hoc wireless protocol, and receives and stores response messages from wireless devices responding to the first wireless ad hoc protocol discovery message, the response messages including information that identifies the responding wireless devices. The computer switches to a second ad hoc wireless communications protocol, transmits a second wireless discovery message via the second ad hoc wireless protocol, and receives and stores response messages from wireless devices responding to the second wireless ad hoc protocol discovery message. The computer switches to the Ethernet or wireless infrastructure mode network communications protocol, and transmits the stored response messages to a central repository.

In other embodiments, the computer caches received Ethernet or wireless infrastructure mode message packets before switching to the first ad hoc wireless communications protocol, and processes the cached Ethernet or wireless infrastructure mode message packets after switching back to the Ethernet or wireless infrastructure mode network communications protocol. In further embodiments, the ad hoc wireless protocols are one or both of the 802.11 wireless protocol and the 802.15 wireless protocol.

Embodiments of the present invention also provide a system, method, and program product for a computer to determine the physical location of a mobile wireless device. A computer receives 1-hop neighbor information from a mobile wireless device, and the computer determines a most likely physical location of the mobile wireless device based on fixed physical locations of wireless devices stored in a database that correspond to the wireless devices that responded to the discovery request transmitted by the mobile wireless device. In other embodiments, the computer also receives 2-hop neighbor information for the mobile wireless device, and uses both the 1-hop and 2-hop neighbor information to determine a most likely physical location of the mobile wireless device.

In further embodiments, the computer determines a count of fixed physical locations of wireless devices stored in a database that correspond to the wireless devices that responded to the discovery request transmitted by the mobile wireless device, or assigns a confidence value to the determined most likely physical location. If the number of discovered wireless devices having fixed physical locations falls below a threshold value, or the assigned confidence value falls below a threshold value, the computer receives 2-hop neighbor information from the mobile wireless device to aid in determining a most likely physical location of the mobile wireless device.

DETAILED DESCRIPTION

Embodiments of the present invention will now be described in detail with reference to the accompanying drawings.

Figure 1:
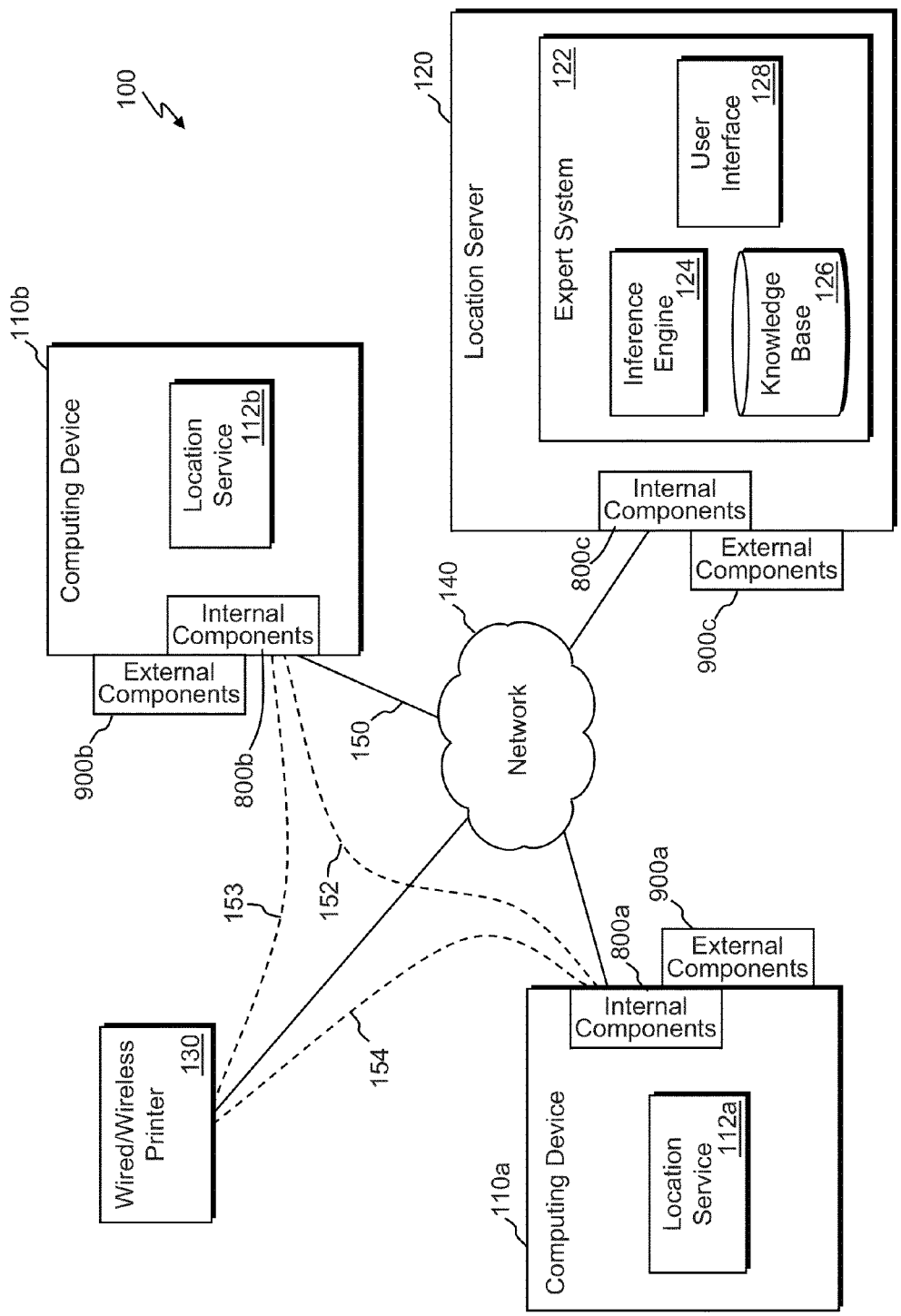
FIG. 1 is a functional block diagram of a hybrid wired and wireless computing environment in accordance with an embodiment of the present invention.

FIG. 1 is a functional block diagram of a hybrid wired and wireless computing environment 100 in accordance with an embodiment of the present invention. Computing environment 100 includes computing devices 110*a* and *b*, location server 120, and printer 130, all interconnected over a network 140.

In the preferred embodiment of the present invention, computing devices 110*a* and *b*, and printer 130 are all Ethernet and wireless enabled. In particular, computing devices 110*a* and *b*, and printer 130 all support the following protocols: the IEEE Std 802.3-2008 Part 3: Carrier Sense Multiple Access with Collision Detection (CSMA/CD) Access Method and Physical Layer Specifications ("Ethernet"); the IEEE Std 802-11n-2009 Part 11: Wireless LAN Medium Access Control (MAC) and Physical Layer (PHY) Specifications; and the IEEE Std 802.15.4a-2007 Part 15.4: Wireless Medium Access Control (MAC) and Physical Layer (PHY) Specifications for Low-rate Wireless Personal Area Networks (WPANs) ("802.15"). IEEE and 802 are registered trademarks of the Institute of Electrical and Electronics Engineers, Incorporated.

The IEEE Std 802.11n-2009 wireless protocol, commonly referred to as 802.11n, is a later version of the IEEE Std 802.11-1999 wireless protocol. Computing devices using the 802.11n wireless protocol typically have a wireless range of as much as 70 meters, although actual ranges in a working environment can be substantially less. Other versions of the 802.11-1999 standard, such as the commonly used 802.11b-1999 and 802.11g-2003 wireless protocols, have a range of about half that of the 802.11n wireless protocol. Although in the preferred embodiment, computing devices 110 support the 802.11n wireless protocol, those skilled in the art will recognize that embodiments of the invention can be practiced using the IEEE Std 802.11-1999 wireless protocol, and any later versions of this protocol including 802.11b, and 802.11g. The 802.11n wireless protocol, and other versions of the IEEE Std 802.11-1999 wireless protocol, are collectively referred to herein as the 802.11 wireless protocol.

The IEEE Std 802.15.4a-2007 is a later version of the Bluetooth-based IEEE Std 802.15.1-2002 wireless protocol. Computing devices using the 802.15.4a wireless protocol typically have a wireless range of about 10 meters, although certain implementations, such as the ultra wide band physical layer (UWB PHY) have a precision ranging capability of about one meter. Although in the preferred embodiment, computing devices 110 support the 802.15.4a wireless protocol, those skilled in the art will recognize that embodiments of the invention can be practiced using the IEEE Std 802.15.1-2002 wireless protocol, and any later versions of this protocol. The 802.15.4a wireless protocol, and other versions of the IEEE Std IEEE Std 802.15.1-2002 wireless protocol, are collectively referred to herein as the 802.15 wireless protocol.

In the preferred embodiment, network 140 represents a hybrid wired/wireless network that includes a wired Ethernet network, and a wireless protocol network operating in infrastructure mode. Network 140 comprises Ethernet and 802.11 wireless protocol routers (not shown) having fixed physical locations. With regards to the Ethernet routers, each port that is used to connect to a wireless enabled device, such as computing devices 110*a* and *b*, and printer 130, can be associated with a physical location. For example, although an Ethernet router may be located in an equipment closet, a port on the router may be connected through building wiring to a specific office in the building. The router port would be associated to the building office by, for example, a database of such associations. Thus, from a network perspective, a device that is identified as being connected to the router port can be mapped to a physical location by performing a router port to physical location lookup in the database.

The 802.11 wireless protocol routers are located in fixed physical locations. For example, wireless routers might be placed in certain locations within a building to provide optimal coverage for wireless enabled devices in the building.

In the preferred embodiment, computing devices 110*a* and *b*, and printer 130 support the infrastructure and ad hoc modes of the 802.11 wireless protocol. The most common manner to use an 802.11 wireless protocol network is in "infrastructure" mode. In this mode, wireless devices communicate with a wireless access point, for example, an 802.11 wireless protocol router. Typically, the wireless router serves as a bridge to a wired local area network (LAN) or wide area network (WAN). In such a network, wireless devices do not communicate directly with each other, but rather via the wireless access point and usually over a LAN or WAN. All wireless devices that are connected to a network via a specific wireless access point are configured to use the same service set identifier (SSID), which serves as an identifier for all devices connected to a specific wireless access point. In 802.11 wireless protocol infrastructure mode, the SSID for a wireless access point typically is the access point's media access control (MAC) address. A MAC address is a unique 48-bit number assigned to the network interface card (NIC) of each wireless device by its manufacturer.

In 802.11 wireless protocol ad hoc mode, a temporary wireless network is established between computers and devices. In an ad hoc wireless network, computers and devices connect directly to each other rather than to a wireless access point. To set up an ad hoc wireless network, each wireless adapter must be configured for ad hoc mode rather than infrastructure mode. In addition, all wireless adapters in the ad hoc wireless network must use the same SSID and the same channel number. Each wireless device can only be a transmitter (TX) or a receiver (RX) at any given time. Communication among wireless devices is limited to a certain transmission range or distance, and wireless devices in the ad hoc wireless network share the same frequency domain to communicate. Within such a range, only one transmission channel is used, covering the entire bandwidth.

In the preferred embodiment, computing devices 110*a* and *b*, and printer 130 also support the 802.15 wireless protocol. Similar to the 802.11 wireless protocol in ad hoc mode, 802.15 wireless protocol can establish wireless connections directly between enabled devices. An 802.15 wireless protocol network established between two or more enabled devices is referred to as a wireless personal area network (WPAN). The 802.15 wireless protocol is a packet-based protocol with a master-slave structure. One master may communicate with up to seven slaves in a "piconet" network, and the slaves in the piconet can only communicate with the master. An 802.15 wireless protocol network is typically established when one 802.15 wireless protocol enabled device in discoverable mode (the slave device) responds to an inquiry from another enabled device seeking other devices (the master device) to connect to. The device in discoverable mode responds to the inquiry with identifying information that can include its MAC address.

In general, network 140 and the wireless devices connected to it can support any combination of communication protocols where at least two of the protocols, or two modes of a single protocol, are wireless protocols that support direct peer-to-peer communications, with one of the protocols having a larger wireless range than the other. In addition, one or more of the wireless computing devices in network 140 must be associated with a fixed physical location.

In FIG. 1, Ethernet and 802.11 wireless protocol infrastructure mode connections in network 140 are represented by solid lines. For example solid line 150 represents such a connection between computing device 110*b* and network 140. 802.11 wireless protocol ad hoc connections and 802.15 wireless protocol connections between wireless enabled devices are represented by dashed lines. For example dashed line 152 represents an 802.11 wireless protocol ad hoc or 802.15 wireless protocol connection between computing devices 110*a* and 110*b*. As illustrated in FIG. 1, an 802.11 wireless protocol ad hoc network might exist that includes computing device 110a, computing device 110b, and printer 130. This ad hoc wireless network is represented by dashed lines 152, 153, and 154.

Computing devices 110a and b include location service programs 112a and b, respectively, internal components 800a and b, respectively, and external components 900a and b, respectively. Location service programs 112a and b are installed on computing devices 110a and b and run as background processes at startup. Location service programs 112 perform the functions of initiating and responding to wireless scans to identify nearby wireless enabled computers. These functions are performed in two modes. The first mode is an administrative mode that is initiated by a request from an administrator node, such as location server 120. In this mode, expert system 122 on location server 120 transmits a request to, for example, computing device 110a to identify all wireless neighbors within its wireless range, or 1-hop wireless neighbors. Computing device 110a initiates an ad hoc wireless mode scan to identify all its or 1-hop neighbors and transmits this information back to expert system 122 over network 140. Expert system 122 can also initiate a cascade scan in which every wireless enabled computing device 110 in network 140 initiates an ad hoc wireless mode scan to identify its 1-hop or multi-hop neighbors. A multi-hop neighbor of a particular wireless device is a wireless device that may or may not be out of wireless range of the particular wireless device, but can be contacted through a chain of one or more intermediate wireless devices. After a node has identified its wireless neighbors, this information is transmitted back to expert system 122 over network 140 for storage in knowledge base 126.

The second mode in which location service programs 112 operate is a user-initiated "locate me" mode. In this mode, a computing device 110 is connected to network 140 via an 802.11 wireless protocol connection. A user initiates an ad hoc wireless mode scan on a computing device 110 to identify its 1-hop neighbors. This neighbor information is transmitted back to expert system 122 over network 140 for storage in knowledge base 126. In certain embodiments of the invention, each 1-hop neighbor of the user computer initiating the locate me request initiates ad hoc wireless scans of their own to identify their 1-hop or multi-hop neighbors. After each node has identified its wireless neighbors, this information is transmitted back to expert system 122 over network 140. The administrative mode scan and the locate me mode scan are described in further detail below.

In the preferred embodiment, location service programs 112 communicate with each other and expert system 122 using the User Datagram Protocol (UDP) as described by the Internet Engineering Task Force (IETF) Standard RFC 768. Other message formats and protocols satisfying implementation requirements for embodiments of the present invention may also be used, for example, the Generalized Mobile Ad Hoc Network (MANET) Packet/Message Format as described in IETF Standard RFC 5444. In the preferred embodiment, location service programs 112 use a packet generator, such as hping or Antirez developed and licensed by Salvator Sanfilippo, to create and parse incoming and outgoing messages. In the preferred embodiment, location service programs 112 and expert system 122 extract all necessary information from the UDP packet payload, such as MAC address, IP address, etc., and interrogate all the header information encapsulated by the different TCP/IP layers. Location service programs 112 and expert system 122 also create a list of the network devices MAC addresses that the package has passed through, which are used to calculate a location determination confidence value. In some embodiments, expert system 122 runs a traceroute function back to one of the computing devices 110 to determine the first neighbor network device a UDP message from the computing device passes through, and extracts the first neighbor network device's IP address. This IP address is then correlated against a list of known network device IP-to-MAC addresses and locations details.

Figure 2:
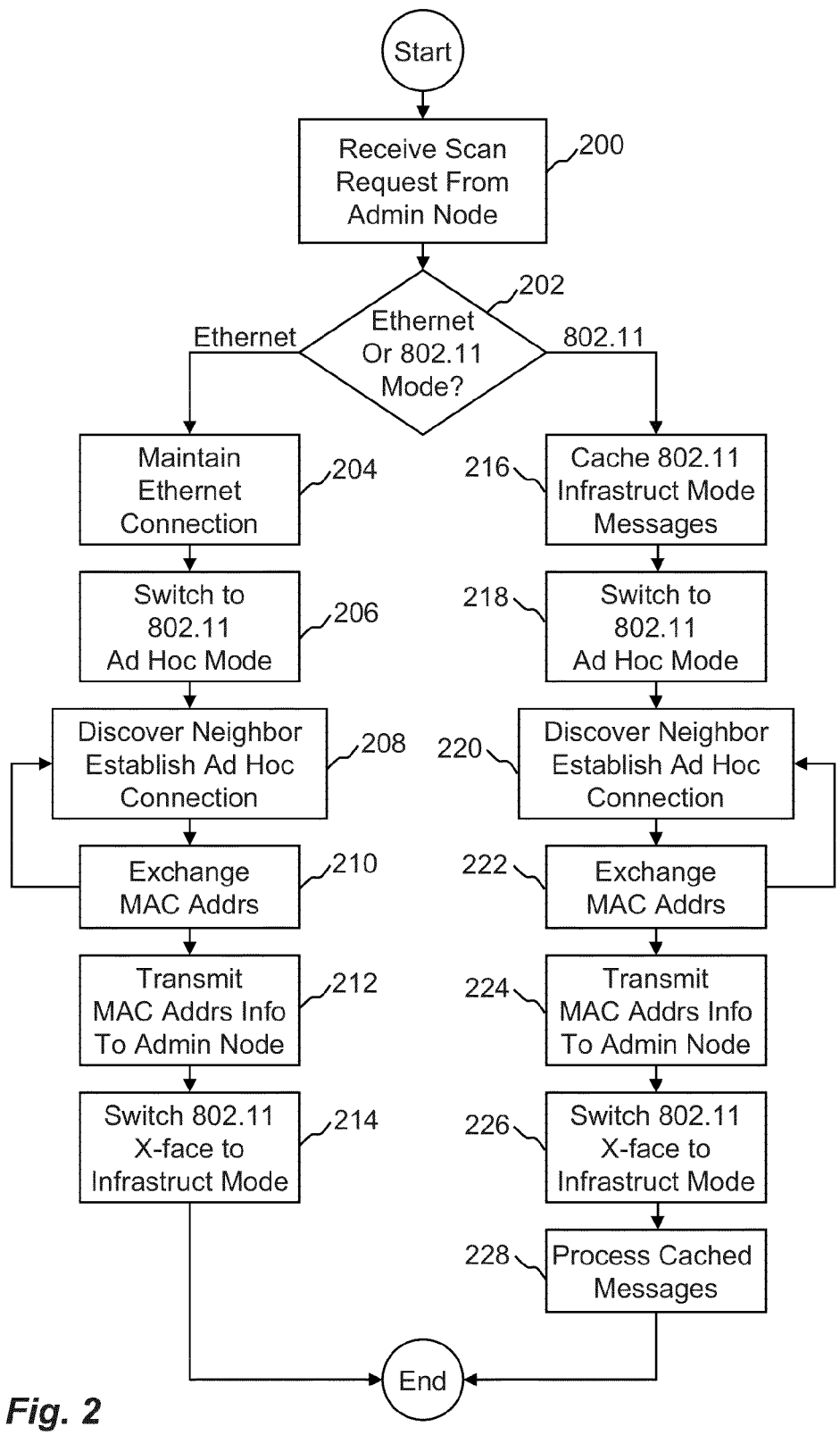
FIG. 2 is a flowchart illustrating an aspect of a location service program in accordance with an embodiment of the present invention.

FIG. 2 is a flowchart illustrating the steps that the location service program 112 performs when receiving a scan request from an administrator node, such as location server 120, in accordance with an embodiment of the invention. A main purpose of an administrator node initiated scan is to collect neighbor information for the wireless nodes in the network 140, which is then stored in knowledge base 126 for use by inference engine 124 of expert system 122. For example, this historical information might be used in conjunction with later user initiated locate me scans to help determine the most likely physical location of the locate me computing device.

At step 200, location service program 112 in a computing device 110 receives a scan request from an administrative node, such as expert system 122 on location server 120, over network 140. At step 202, depending on whether computing device 110 is connected to network 140 via an Ethernet connection or an 802.11 wireless protocol infrastructure mode connection, one of two processing paths is taken.

If computing device 110 is connected to network 140 via an Ethernet connection, then at step 204, computing device 110 maintains the Ethernet connection. In the preferred embodiment of the invention, computing device 110 can maintain concurrent Ethernet and 802.11 wireless protocol connections. One arrangement in which computing device 110 might maintain concurrent Ethernet and 802.11 wireless protocol connections is if the Ethernet and 802.11 wireless protocol connections use different IP addresses obtained from different DHCP servers, for example one DHCP server supporting an Ethernet LAN and a second DHCP server supporting an 802.11 wireless protocol LAN.

At step 206, location service program 112 causes the 802.11 wireless protocol NIC to switch to ad hoc mode. At step 208, location service program 112 causes the 802.11 wireless protocol NIC to perform a discovery operation, and at step 210, to exchange MAC addresses with its 1-hop wireless neighbors. The discovery and exchange steps are repeated for all discoverable neighbors of computing device 110. At step 212, after MAC addresses are exchanged with all discoverable neighbors, location service program 112 causes the discovered neighbor MAC addresses to be transmitted over network 140 via the Ethernet connection of computing device 110 to expert system 122 for storage in knowledge base 126. At step 214, the 802.11 wireless protocol NIC of computing device 110 is switched back to infrastructure mode.

In certain embodiments of the invention in which computing device 110 does not support concurrent Ethernet and 802.11 wireless protocol connections, location service program 112 terminates the Ethernet network connection at step 204 by issuing an "ipconfig/release" command, disabling the Ethernet NIC, enabling the 802.11 wireless protocol NIC, and issuing an "ipconfig/renew" command to establish an 802.11 wireless protocol network connection. Location service program 112 continues with steps 206 through 210 as described above, and then terminates the 802.11 wireless protocol connection and re-establishes the Ethernet connection just before step 212. Step 212 is executed as described above. Step 214 would not be executed because computing device is connected to network 140 via an Ethernet connection and the 802.11 wireless protocol NIC would not be active.

As mentioned above, in the preferred embodiment computing device 110 performs a wireless neighbor scan while concurrently connected to network 140 via an Ethernet wired connection as a result of an administrator mode request from expert system 122. In the preferred embodiment, if a user invokes the locate me function of a location service program 112 while computing device 110 is connected to network 140 via an Ethernet connection, then location service program 112 recognizes that the network connection is via the wired NIC. Location service program 112 transmits to expert system 122 over network 140 the MAC address of the Ethernet NIC of computing device 110 and other identifying information, for example, the Ethernet router port address the NIC is connected to, the MAC address of the Ethernet router, etc. In this situation determining the physical location of a computing device 110 may only require a lookup in knowledge base 126 of the location associated with the Ethernet router port to which computing device 110 is connected.

If computing device 110 is connected to network 140 via an 802.11 wireless protocol infrastructure mode connection, then at step 216, incoming 802.11 wireless protocol infrastructure mode messages are cached. Steps 218 through 226 are handled in the same manner as described above. At step 228, after the 802.11 wireless protocol NIC of computing device 110 is switched back to infrastructure mode, the cached incoming messages are processed and the 802.11 wireless protocol connection returns to normal operation.

In certain embodiments, expert system 122 will initiate a cascade scan for the purpose of identifying neighbor chains for each wireless enabled computing device 110 back to a wireless device associated with a fixed physical location. This is accomplished, for example, by having each computing device 110 identify all of its 1-hop and 2-hop neighbors. Expert system 122 determines if each computing device 110 has identified a 1-hop or 2-hop neighbor chain to a wireless device associated with a fixed physical location using information stored in knowledge base 126. If a computing device 110 has not identified a wireless device associated with a fixed physical location in its 1-hop or 2-hop neighbor chains, expert system 122 initiates a wireless scan for that computing device 110 to identify its 3-hop or 4-hop neighbors. The process that a computing device 110 follows is similar to that described with relation to FIG. 2, except that a computing device 110 is receiving a request to initiate a neighbor scan from a neighboring computing device rather than from expert system 122. In addition, the MAC address information exchanged can also include the address of the computing device 110 that originally requested the multi-hop neighbor scan. The multi-hop neighbor information is transmitted back to the computing device 110 that initiated the scan, where it is collected and transmitted to expert system 122 for storage in knowledge base 126. The multi-hop neighbor information can also be transmitted by each neighbor node directly to expert system 122.

Figure 3:
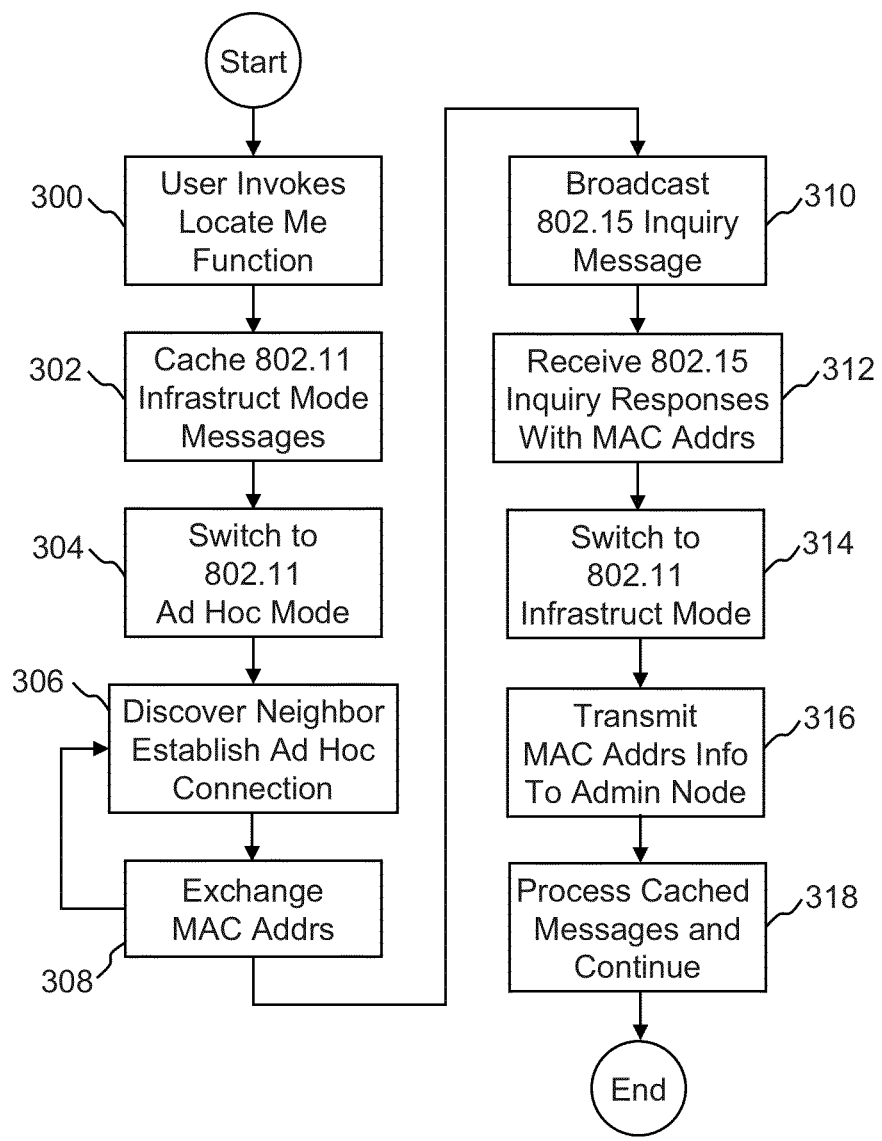
FIG. 3 is a flowchart illustrating a second aspect of a location service program in accordance with an embodiment of the present invention.

FIG. 3 is a flowchart illustrating the steps that location service program 112 performs when a user invokes the locate me function on a computing device 110 in accordance with the preferred embodiment of the invention. In the preferred embodiment, computing device 110 is connected to network 140 via an 802.11 wireless protocol infrastructure mode connection when the locate me function is invoked.

At step 300, computing device 110 receives a user request to invoke the locate me function. The request can be invoked, for example, by the user mouse clicking on a toolbar icon on the display screen 920 (see FIG. 8) of computing device 110. At step 302, incoming 802.11 wireless protocol infrastructure mode messages are cached. At step 304, location service program 112 causes the 802.11 wireless protocol NIC to switch to ad hoc mode. At step 306, location service program 112 causes the 802.11 wireless protocol NIC to perform a discover operation to discover all of its 1-hop wireless neighbors, and exchange MAC addresses with them at step 308. Steps 306 and 308 are repeated for all discoverable neighbors of computing device 110.

In certain embodiments of the invention, computing devices 110 are 802.15 wireless protocol enabled, and steps 310 and 312 are performed to identify the 802.15 wireless protocol 1-hop neighbors of a computing device 110. Performing neighbor discovery using an 802.15 wireless protocol NIC may be beneficial if a neighbor discovery process using a wireless interface having a smaller range is desired. For example, if an 802.11 wireless protocol discovery process executed by a computing device 110 identifies every wireless device in a building as a neighbor, a more selective discovery process may be desired. An 802.15 wireless protocol NIC typically has a range of about 30 meters, although this would probably be less in practice, and can have a range as small as one meter if the UWB PHY implementation is used.

At step 314, the 802.11 wireless protocol NIC is switched back to infrastructure mode. At step 316, the collected 1-hop neighbor MAC address information is transmitted over network 140 to expert system 122 on location server 120 for storage in knowledge base 126. At step 318, any cached 802.11 wireless protocol infrastructure mode messages are processed, and the 802.11 wireless protocol connection returns to normal operation.

In a preferred embodiment of the invention, a user initiating a locate me request causes each 1-hop neighbor of the initiating computing device to initiate a 1-hop or multi-hop neighbor discovery process of its own, and transmit this information to expert system 122. This two strand approach helps to assure that a neighbor chain from the computing device initiating the locate me request to a wireless device having a fixed physical location can be established, and the additional neighbor information can assist in identifying a most likely physical location for the initiating computing device. This approach is also helpful in the situation in which the computing device initiating the locate me request is not within range of a wireless device associated with a fixed physical address, for example a wireless router or a wireless enabled desktop computer. In this situation, the initiating device is not able to directly transmit the neighbor information it has collected. However, the 1-hop or multi-hop neighbors of the initiating device may be able to transmit their gathered neighbor information, which will include an indication of the MAC address that initiated the locate me request.

Figure 4:
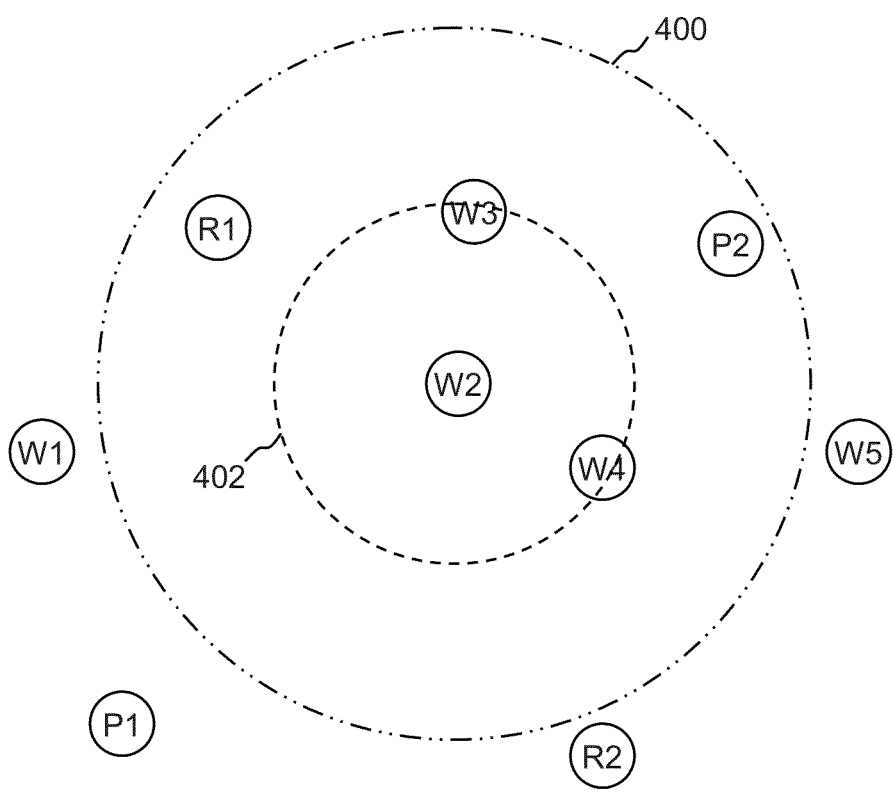
FIG. 4 illustrates a two-dimensional plan view of a wireless network in which a device executes a neighbor scan in accordance with an embodiment of the present invention.

FIG. 4 depicts graphic representations of an aspect of the neighbor discovery process in accordance with an embodiment of the present invention. The wireless devices within circle 400 might represent those discovered during a discovery process initiated by a computing device W2 in accordance with steps 208-210, 220-222, or 306-308. As illustrated, computing device W2 has identified computing devices W3 and W4, wireless router R1, and wireless printer P2 as neighbors. In this example, printer P2, router R1, are associated with fixed physical locations in knowledge base 126, as well as possibly one or both of computing devices W3 and W4. The devices within circle 402 represent those devices discoverable by computing device W2 by an 802.15 wireless protocol scan. As illustrated, the devices within circle 402 do not include any printers or routers. Thus, computing device W2 may not be able to identify any neighbors associated with fixed physical locations with this scan.

In embodiments of the invention, the neighbor information discovered by the scans is transmitted back to expert system 122, which uses this information to determine a likely physical location for computing device W2. From a visual perspective, referring to FIG. 4, a likely physical location for computing device W2 is determined as the area within which W2 moves as the center of circle 400, as circle 400 is moved through all positions that include fixed location devices router R1 and printer P2.

Figure 5:
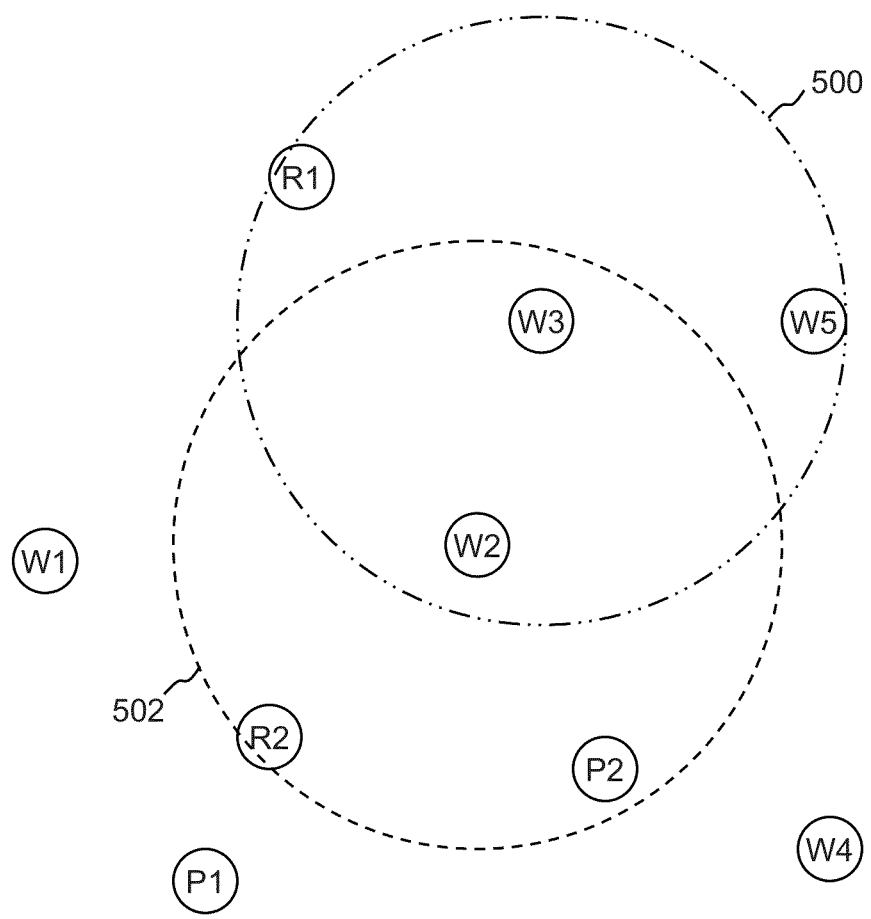
FIG. 5 illustrates a second two-dimensional plan view of a wireless network in which a device executes a neighbor scan in accordance with another embodiment of the present invention.

FIG. 5 depicts a graphic representation of an aspect of the 2-hop neighbor discovery process in accordance with an embodiment of the present invention. The devices within circle 500 represent the wireless devices that computing device W3 can discover. As illustrated, router R1 and computing devices W2 and W5 are identified as neighbors by computing device W3. If router R1 is associated with a physical location, but computing devices W2 and W5 are not, then expert system 122 will be able to establish a physical location for computing device W3 only as accurate as an area around router R1 with a radius of the range of the wireless connection of computing device W3. In the context of an administrator initiated scan, expert system 122 may send scan requests to all neighbor computing devices identified by computing device W3. As shown, the devices within circle 502 are discoverable by computing device W2. These include router R2 and printer P2, which are associated with fixed physical locations, and computing device W3. Expert system 122 now has additional information with which to better identify a likely physical location for computing device W3. From a visual perspective, a likely physical location for computing device W3 is determined by first identifying the overlapping ranges of router R2 and printer P2, then identifying the area in which device W3 is within range of both router R1 and device W2 when device W2 is within the overlapping ranges of router R2 and printer P2. The likely physical location of computing device W3 can likely be narrowed further if more devices in the network are associated with fixed physical locations and possible use of scans having smaller and larger ranges.

Figure 8:
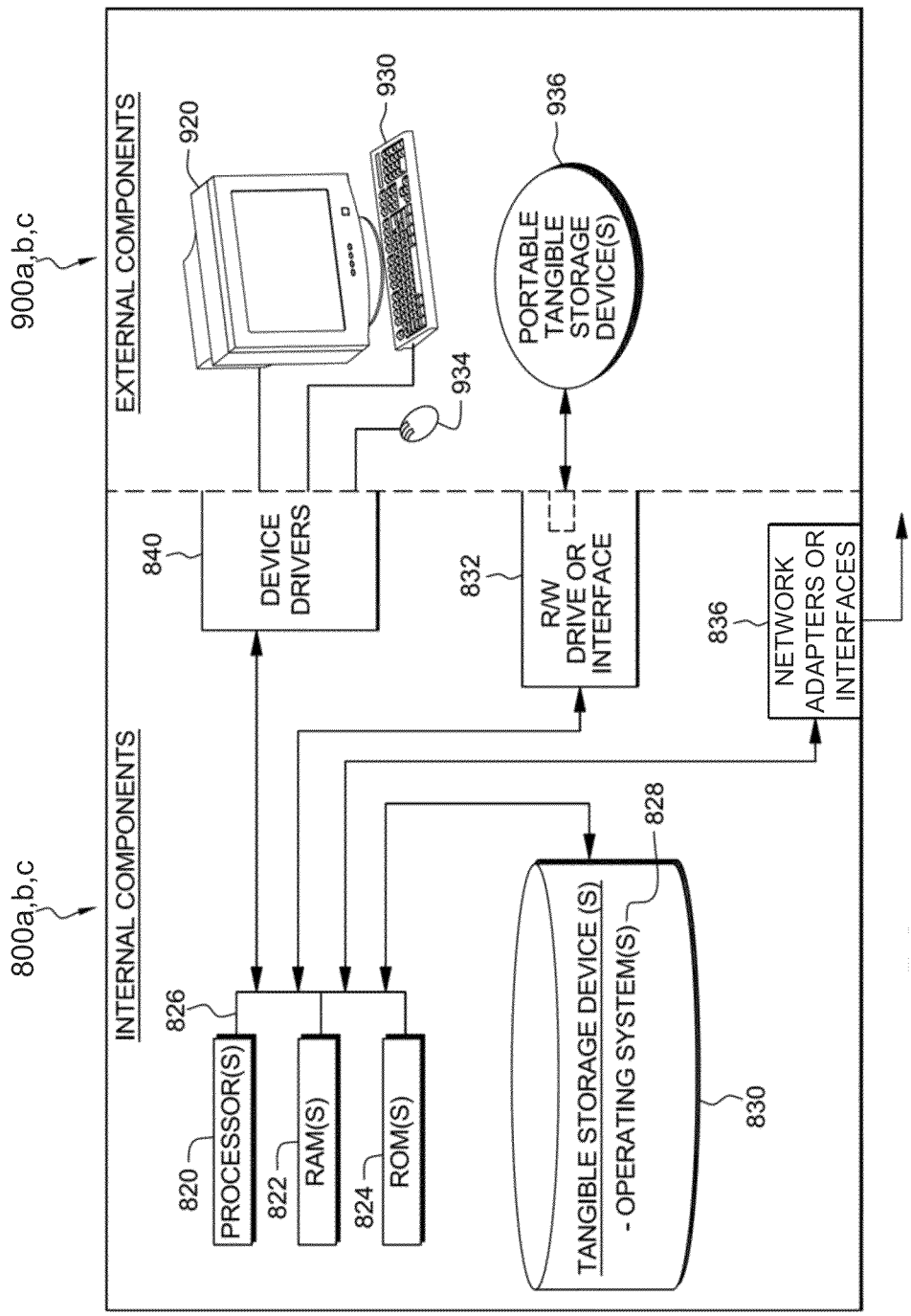
FIG. 8 is a block diagram of hardware and software within the computers of FIG. 1 in accordance with an embodiment of the present invention.

Location server 120 includes expert system 122, user interface 128, internal components 800c (see FIG. 8), and external components 900c (see FIG. 8). Expert system 122 further includes an inference engine 124, and a knowledge base 126. Expert system 122 operates to initiate neighbor scans in computing devices 110 in network 140, to store the results of these scans in knowledge base 126, to store certain additional relatively permanent information in the knowledge base relating to the network, and to determine, based on a set of production rules, the physical location of a computing device 110 when the locate me function of location service 112 is invoked. More generally, an expert system can be viewed as a method for representing a body of knowledge for the purpose of solving a specified problem. In the preferred embodiment of the invention, expert system 122 is a commercially available or open source software package, or a user-written expert system program in a language that is designed for logic programming or artificial intelligence, such as Prolog or Lisp. Prolog and Lisp programming environments are available both commercially and as open source.

Knowledge base 126 stores information on all the fixed location wireless devices in the network 140, such as wireless routers, wireless printers, desktop computers with wireless capability, etc. Information on fixed point network ports is also stored, for example, the building locations associated with the specific ports on an Ethernet router in network 140. The information included for each fixed location wireless device and fixed point network port may include, for example, building floor number, grid reference or office number, wireless device MAC address, Ethernet port number, Ethernet router MAC address, and wireless router MAC address. An Ethernet port that is not dedicated to a specific device, for example an Ethernet port that serves a conference room and is used as needed by anyone that uses the conference room, can have an entry in knowledge base 126. A discovery request response from a device attached to a conference room Ethernet port can include the Mac address of the Ethernet router and the port number. In the preferred embodiment, user interface 128 provides a computer user interface by which an administrator of location server 120 can interact directly with knowledge base 126 for the purpose of, for example, entering and editing fixed location information, submitting queries to the knowledge base, performing maintenance functions on the knowledge base, etc.

Knowledge base 126 also stores neighbor scan information returned by computing devices 110 in the network as a result of executing location service programs 112. This information can be extracted to determine, for example, neighbor chains representing 1-hop or multi-hop neighbor information for a given wireless network device. The neighbor chain information can be in the form of a linked list of MAC addresses. Each MAC address may further be associated with additional database information, such as the MAC addresses of other NICs on the wireless network device, or a physical location for the wireless device. In certain embodiments of the invention, historical information from multiple neighbor scans is also stored.

In the preferred embodiment, knowledge base 126 is a relational database, such as the DB2® database by IBM, that supports a database query language, such as SQL. In general, knowledge base 126 can be any database capable of storing neighbor information returned by location service programs 112, and providing an interface to inference engine 124 in support of the required functions of the inference engine and expert system 122 in accordance with embodiments of the present invention.

Inference engine 124 is a computer program that operates to apply the production rules to the neighbor scan information also stored in knowledge base 126, to determine the most likely location of a user invoking the locate me function on a computing device 110. In the preferred embodiment, inference engine 124 applies the production rules to the scan information in knowledge base 126 in a forward chaining process. Generally, a forward chaining rule based process takes facts as they become available and attempts to draw conclusions, based on satisfying rule conditions, which lead to actions being executed. Some examples in pseudo-code of production rules that expert system 122 might process are:

```
If fixed_ref > 1 and neighbour_MAC_total > 1 then        (1)
    call evaluate_position, halt;
If fixed_ref = 0 and neighbour_MAC_total <= 1 then       (2)
    call full_scan, call historial_data_match,
    call re-evaluate position, halt;
if evaluate_position_weight_factor >=50 and < 85 then    (3)
    call historical_data_medium_scan,
    call re-evaluate_position, halt;
```

Figure 6:
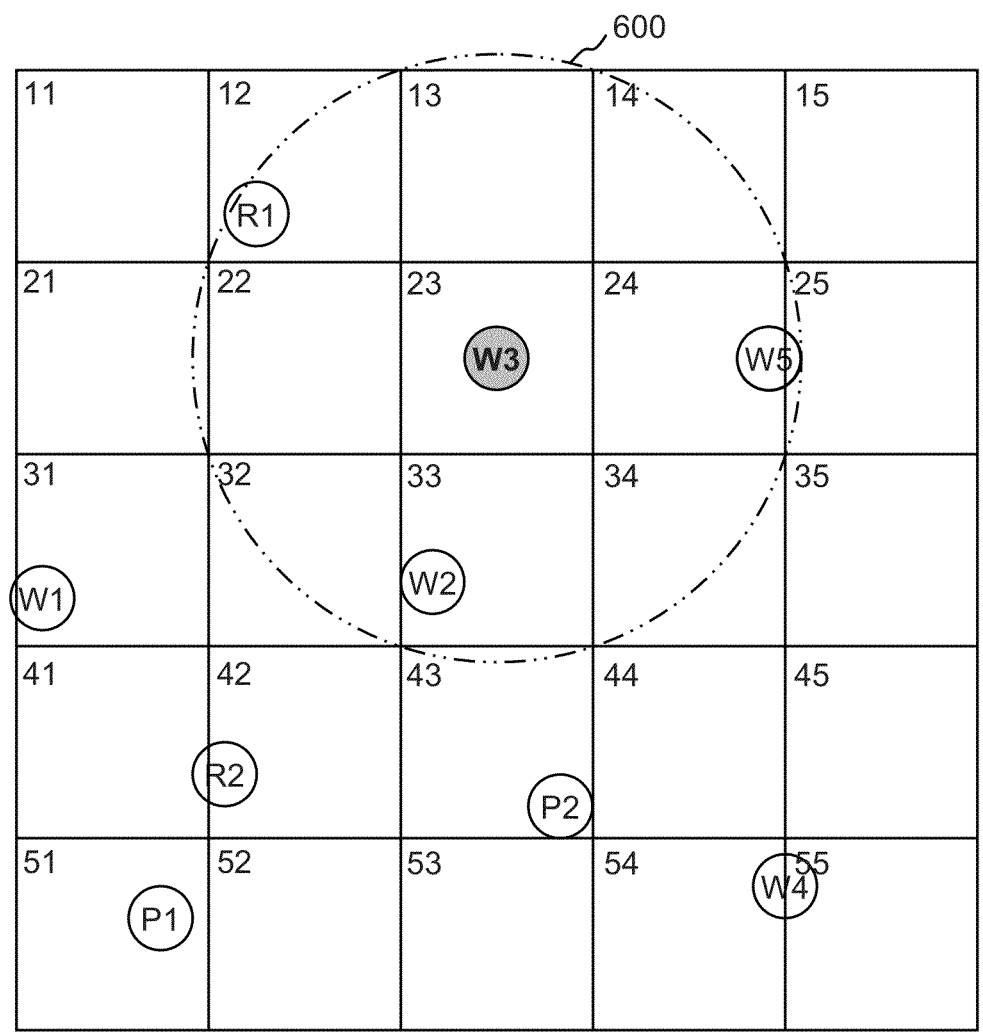
FIG. 6 illustrates a two dimensional plan view of a wireless network in which a expert system determines a wireless device's location in accordance with an embodiment of the present invention.

These example rules can be used to determine the steps that expert system 122 can take after an initial processing of the results of a neighbor scan initiated by invoking the locate me function of location service 112 on a computing device 110. Example rule (1) determines that if the neighbor scan results indicate that two or more fixed location wireless devices were discovered and two or more MAC addresses were returned, then call the evaluate position routine. Example (2) determines that if no fixed location wireless devices were discovered and zero or one MAC addresses were returned from the initial neighbor scan, then initiate a further multi-hop scan, bring in historical scan data that may indentify the location of the locate me initiating device, and re-evaluate the data to determine a location of the locate me device. Example (3) uses a confidence value related to the location determined by the evaluate position routines to determine if a broader scan and historical data should be used to further refine the determined position of the locate me device. For example, a neighbor scan may discover several fixed location devices, but they may all be located in close proximity to each other. In this case, the evaluate position routine is only be able to identify a probable location area around the fixed location devices having a radius of about the wireless range of the fixed location devices. In the preferred embodiment, the evaluate position routine assigns a low confidence value to a location determined from such neighbor scan data. In example (3), if the confidence value associated with the location determined by the evaluate position routine is between 50 and 85, additional historical scan data is pulled in, and the location of the locate me device is re-evaluated. A different production rule in this situation might require additional scans from the locate me computing device to be performed in 802.15 wireless protocol mode FIGS. 6 and 7 visually illustrate an example of how expert system 122 can determine the location of a computing device 110 that has invoked the locate me function of location service 112. As illustrated in FIG. 6, an area, for example a floor of an office, has been subdivided into grid areas 11-15, 21-25, etc. These grid locations might represent offices, pillar and post numbers, etc. In the office area, several wireless devices in accordance with embodiments of the present invention are located. For example, a computing device 110, labeled W1 is located in grid area 31, a wireless router R1 is located in grid area 12, and a wireless enabled printer P1 is located in grid area 51. In this example, only routers R1, R2, and printers P1, P2 are associated with fixed locations. Computing devices W1, W2, W3, W4 and W5 are all mobile and not associated with fixed locations.

In this example, computing device W3 in grid area 23 invokes the locate me function. Circle 600 represents the area in which W3 can discover other wireless devices using an 802.11 wireless protocol ad hoc mode discovery process. Computing devices W2 and W5, and printer R1 are discovered. Location service 112 on W3 collects the neighbor information from the discovery process, formats the information as neighbor chains, and transmits the information over 802.11 wireless protocol network 140 to expert system 122 on location server 120. The neighbor chain information consists of the following three chains:

W3→R1
W3→W2
W3→W5

In this example, the neighbor chains are transmitted to expert system 122, and inference engine 124 processes the information, based on production rules, to determine if, for example, a multi-hop scan is needed for a location determination having an acceptable confidence value. For example, the neighbor chain information can be processed by production rule (1) above. In this example, because W3 has discovered three neighbors having fixed locations, production rule (1) would not require additional scans.

Figure 7:
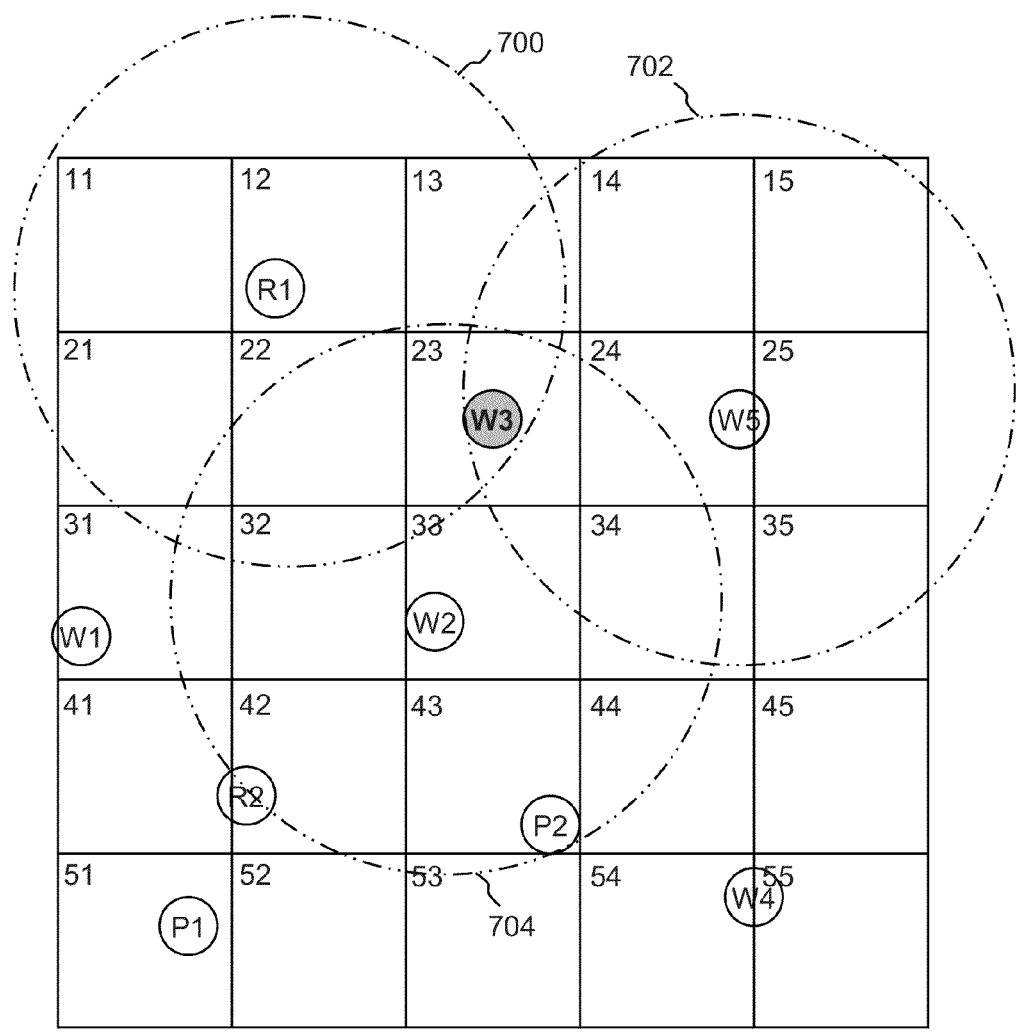
FIG. 7 illustrates a second two dimensional plan view of a wireless network in which an expert system determines a wireless device's location in accordance with an embodiment of the present invention.

FIG. 7 graphically illustrates the next step expert system 122 takes in determining a likely physical location for computing device W3. In this step, inference engine 124 determines possible locations for computing device 110 that satisfy each of the neighbor chains resulting from W3's discovery process, then reduces the possible outcomes to identify locations that satisfy all of the neighbor chains. As is illustrated, inference engine 124 identifies the locations at which router R1, and computing devices W2 and W5 can all concurrently "see" W3. Referring to FIG. 7, this would be the intersection of circles 700, 702, and 704

Expert system 122 contains rules that define the locations within discovery range of each fixed location wireless device in the network. This information could, for example, be entered manually by the expert system administrator, or derived from administrative scan information. The locations rules for router R1 and computing devices W2 and W5, the neighbors discovered by W3, are as follows:

If R1, then possible locations are: 11,12,13,21,22,23, 31,32,33; (4)

If W2, then possible locations are: 21,22,23,24,31,32, 33,34,41,42,43,44,52,53; (5)

If W5, then possible locations are: 13,14,15,23,24,25, 33,34,35; (6)

Inference engine 124 begins with the locations at which a device can discover router R1. Because W3 can see both R1 and W2, inference engine 124 processes location rules (4) and (5) to identify locations at which both R1 and W2 can be discovered. This operation, called trimming, yields locations 21, 22, 23, 31, 32, and 33. Because W3 can also see W5, inference engine 124 further processes rule (6) to include locations at which W5 can be discovered, and trims the outcomes again to identify locations at which all of R1, W2, and W5 can be discovered. This yields locations 23 and 33 as the likely locations for computing device W3. Inference engine 124 might assign a high confidence value to this outcome based on the fact that all devices discovered by W3 have fixed locations, and the outcomes were trimmed to just two locations in the office area.

In the preferred embodiment, after likely locations for the locate me computing device and confidence values are determined, inference engine 124 processes the likely locations and confidence values with a set of production rules, such as example production rule (3) above, to determine if further neighbor scans are needed. For example, if a confidence value of 75 is assigned to a set of likely locations resulting from one or more neighbor scans initiated by a locate me request from a computing device 110, then, in accordance with, for example, production rule (3) above, additional historical neighbor scan information can be included in the location rule sets, and the likely locations are re-determined.

While this example illustrates how aspects of an embodiment of the invention can work in an environment that includes only one floor of a building, it will be recognized that the embodiment can perform in the same manner in an environment that includes multiple floors of a building. For example, location rule (4) can include locations on other building floors at which router R1 can be discovered.

FIG. 8 depicts a block diagram of the components included in data processing system 800, 900, such as user computing devices 110, and location server 120, in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a computer system, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User computing devices 110, or location server 120, include respective sets of internal components 800 a, b, c and external components 900 a, b, c illustrated in FIG. 8. Each of the sets of internal components 800 a, b, c includes one or more processors 820, one or more computer-readable RAMs 822, one or more computer-readable ROMs 824 on one or more buses 826, one or more operating systems 828, and one or more computer-readable tangible storage devices 830. The one or more operating systems 828 and programs 112 in user computing devices 110 and programs 124 and 128 in location server 120 are stored on one or more of the respective computer-readable tangible storage devices 830 for execution by one or more of the respective processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 can be a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 112 in user computing devices 110 and programs 124 and 128 in location server 120 can be stored on one or more of the respective portable computer-readable tangible storage devices 936, read via the respective R/W drive or interface 832 and loaded into the respective hard drive 830.

Each set of internal components 800 a, b, c also includes network adapters or interfaces 836 such as a TCP/IP adapter cards, wireless wi-fi interface cards, or 3G or 4G wireless interface cards or other wired or wireless communication links. The programs 112 in user computing devices 110 and programs 124 and 128 in location server 120 can be downloaded to respective computers 110 and 120 from an external computer via a network (for example, the Internet, a local area network or other, wide area network) and respective network adapters or interfaces 836. From the network adapters or interfaces 836, the programs 112 in user computing devices 110 and programs 124 and 128 in location server 120 are loaded into the respective hard drive 830. The network 140 may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices. Each of the sets of internal components 800 a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method to determine the physical location of a mobile wireless device, the method comprising the steps of:
   a computer receiving 1-hop neighbor information from a mobile wireless device, wherein the 1-hop neighbor information comprises the identities of one or more wireless neighbors of the mobile wireless device responding to a discovery request transmitted by the mobile wireless device in an ad hoc wireless communications protocol;
   the computer receiving 2-hop neighbor information from each of the one or more responding 1-hop wireless neighbors of the mobile wireless device, wherein the 2-hop neighbor information comprises the identities of one or more wireless second-hop neighbors associated with each of the one or more responding 1-hop wireless neighbors of the mobile wireless device;
   the computer determining a physical location of the mobile wireless device based in part on:
   fixed physical locations of wireless devices stored in a database that correspond to the one or more wireless devices responding to the discovery request transmitted by the mobile wireless device; and
   an area in which the mobile wireless device is in a transmission range of each of the one or more 1-hop wireless neighbors of the mobile wireless device responding to the discovery request that are associated with a fixed physical location; and an area in which the mobile wireless device is in a transmission range of each of the one or more responding 1-hop wireless neighbors of the mobile wireless device that are not associated with a fixed physical location, where each of the responding 1-hop neighbors not associated with a fixed physical location is in the transmission range of its associated second-hop wireless neighbors that are associated with fixed physical locations.

2. A method in accordance with claim 1, further comprising the steps of:

the computer determining a count of fixed physical locations of wireless devices stored in a database that correspond to the one or more wireless devices that responded to the discovery request transmitted by the mobile wireless device; and based on the determined count being below a threshold value, the computer transmitting a request to the one or more wireless devices that responded to the discovery request transmitted by the mobile wireless device to respond with information identifying the wireless neighbors, and the computer receiving the 2-hop neighbor information from each of the one or more responding wireless neighbors of the mobile wireless device.

3. A method in accordance with claim 1, further comprising the steps of:

the computer assigning a confidence value to the determined physical location;

based on the assigned confidence value being below a threshold value, the computer transmitting a request to the one or more wireless devices that responded to the discovery request transmitted by the mobile wireless device to respond with information identifying the wireless neighbors, and the computer receiving the 2-hop neighbor information from each of the one or more responding wireless neighbors of the mobile wireless device.

4. A computer program product to determine the physical location of a mobile wireless device, the computer program product comprising:

one or more computer-readable tangible storage devices and program instructions stored on at least one of the one or more computer-readable tangible storage devices, the program instructions comprising:

program instructions to receive 1-hop neighbor information from a mobile wireless device, wherein the 1-hop neighbor information comprises the identities of one or more wireless neighbors of the mobile wireless device responding to a discovery request transmitted by the mobile wireless device in an ad hoc wireless communications protocol;

program instructions to receive 2-ho neighbor information from each of the one or more responding 1-hop wireless neighbors of the mobile wireless device, wherein the 2-hop neighbor information comprises the identities of one or more wireless second-hop neighbors associated with each of the one or more responding 1-hop wireless neighbors of the mobile wireless device;

program instructions to determine a physical location of the mobile wireless device based in part on:

fixed physical locations of wireless devices stored in a database that correspond to the one or more wireless devices responding to the discovery request transmitted by the mobile wireless device; and an area in which the mobile wireless device is in a transmission range of each of the one or more 1-hop wireless neighbors of the mobile wireless device responding to the discovery request that are associated with a fixed physical location; and an area in which the mobile wireless device is in a transmission range of each of the one or more responding 1-hop wireless neighbors of the mobile wireless device that are not associated with a fixed physical location, where each of the responding 1-hop neighbors not associated with a fixed physical location is in the transmission range of its associated second-hop wireless neighbors that are associated with fixed physical locations.

5. A computer program product in accordance with claim 4, further comprising:

program instructions to determine a count of fixed physical locations of wireless devices stored in a database that correspond to the one or more wireless devices that responded to the discovery request transmitted by the mobile wireless device;

based on the determined count being below a threshold value, program instructions to transmit a request to the one or more wireless devices that responded to the discovery request transmitted by the mobile wireless device to respond with information identifying the wireless neighbors, and program instructions to receive the 2-hop neighbor information from each of the one or more responding wireless neighbors of the mobile wireless device.

6. A computer program product in accordance with claim 4, further comprising:

program instructions to assign a confidence value to the determined physical location;

based on the assigned confidence value being below a threshold value, program instructions to transmit a request to the one or more wireless devices that responded to the discovery request transmitted by the mobile wireless device to respond with information identifying the wireless neighbors, and program instructions to receive the 2-hop neighbor information from each of the one or more responding wireless neighbors of the mobile wireless device.

* * * * *